United States Patent [19]

Loshaek

[11] Patent Number: 4,668,240

[45] Date of Patent: May 26, 1987

[54] PIGMENT COLORED CONTACT LENSES AND METHOD FOR MAKING SAME

[75] Inventor: Samuel Loshaek, Chicago, Ill.

[73] Assignee: Schering Corporation, Kenilworth, N.J.

[21] Appl. No.: 809,542

[22] Filed: Dec. 16, 1985

Related U.S. Application Data

[63] Continuation-in-part of Ser. No. 730,212, May 3, 1985, abandoned, and a continuation-in-part of Ser. No. 688,927, Jan. 4, 1985, abandoned.

[51] Int. Cl.$^4$ .......................... D06P 5/00; D06P 3/52
[52] U.S. Cl. .......................... 8/507; 8/509; 8/552; 8/557; 8/602; 8/637; 8/661
[58] Field of Search .......................... 8/507

[56] References Cited

U.S. PATENT DOCUMENTS

| | | | |
|---|---|---|---|
| 2,241,415 | 5/1941 | Moulton | 523/106 |
| 2,884,336 | 4/1959 | Loshaek et al. | 117/111 |
| 2,884,340 | 4/1959 | Loshaek | 117/76 |
| 3,536,386 | 10/1970 | Spivack | 351/160 |
| 3,557,261 | 1/1971 | Wichterle | 351/106 |
| 3,679,504 | 7/1972 | Wichterle | 156/86 |
| 3,786,034 | 1/1974 | Blair et al. | 260/77.5 |
| 3,821,136 | 6/1974 | Hudgin et al. | 260/9 |
| 4,252,421 | 2/1981 | Foley | 8/507 |
| 4,304,895 | 12/1981 | Loshaek | 526/313 |
| 4,359,558 | 11/1982 | Gould et al. | 525/454 |
| 4,405,773 | 9/1983 | Loshaek et al. | 351/160 R |
| 4,447,474 | 5/1984 | Neefe | 427/164 |
| 4,460,532 | 7/1984 | Neefe | 351/162 |
| 4,468,229 | 8/1984 | Su | 8/507 |
| 4,472,327 | 9/1984 | Neefe | 523/106 |
| 4,490,495 | 12/1984 | Weber | 8/507 |
| 4,518,390 | 5/1985 | Rabenau | 8/507 |

OTHER PUBLICATIONS

K. Venkataraman, "The Chemistry of Synthetic Dyes", vol. V, (Academic Press, 1971), p. 314.
Derwent Abstract 17961K08, EP 72353.

*Primary Examiner*—A. Lionel Clingman
*Attorney, Agent, or Firm*—Warrick E. Lee, Jr.

[57] ABSTRACT

Colored contact lenses are produced by providing a contact lens constructed of polymer and coating at least a portion of the lens with coloring substance and binding polymer. The lens and binding polymers are bonded to each other by the reaction of functional groups selected from at least one of —COOH, —OH, and —NH—R, wherein R is hydrogen or alkyl, with functional groups selected from at least one of —NCO and epoxy.

21 Claims, No Drawings

PIGMENT COLORED CONTACT LENSES AND METHOD FOR MAKING SAME

This is a continuation-in-part of U.S. patent application Ser. No. 688,927, filed Jan. 4, 1985, aband. and a continuation-in-part of U.S. patent application Ser. No. 730,212, filed May 3, 1985, both of which are now abandoned.

The present invention relates to contact lenses capable of imparting an apparent color modification to the wearer's iris. The inventive lenses may be prepared with or without an optical prescription for correcting visual defects. The inventive lenses may contain an opaque color coat which can bring about a fundamental color change in the apparent color of the wearer's iris, for example from dark brown to light blue. Alternatively, the color coat may be transparent, in which case the apparent eye tint may be enhanced or the apparent color of light-colored eyes may be changed, for example, from light blue to green. Hence, as used throughout the present specification and claims, the term "colored contact lens" is intended to mean a lens having either a transparent or an opaque color coat.

The invention provides a high degree of flexibility in coloring the lenses. Not only is it possible to choose from opaque or transparent color coats, but it is also possible to color selected portions of the lens. Moreover with the invention, it is possible to color the lens in a pattern that simulates the fine structure of the iris, using more than one color if that is desirable. Alternatively, it is possible to deposit an opaque pattern over the iris portion of the lens in a manner that can change the apparent color of the iris, but allows visualization of the structure of the iris, as described in U.S. patent application Ser. No. 600,860, filed Apr. 16, 1984 and having an assignee in common with the present application now U.S. Pat. No. 4,582,402. Both hard, i.e., non-hydrophilic lenses, and soft, i.e., hydrophilic lenses, may be colored provided the lens polymer contains the required functional groups as discussed later. The inventive lenses are quite durable and retain their color upon prolonged use, even though subjected to the usual disinfecting and cleaning procedures.

Prior colored contact lenses do not possess all of the advantages of the present invention. U.S. Pat. No. 4,468,229 (Su) discloses colored lenses having reactive dyes bonded to the lens polymer throughout the depth of the lens. However, it is not possible to deposit the reactive dyes in the highly desirable patterns as discussed above.

U.S. Pat. Nos. 3,679,504 (Wichterle) and 3,535,386 (Spivack) disclose lenses wherein the pigment is sandwiched between two layers of polymer or wherein liquid polymer is coated over the pigment and solidified. However, the sandwich lenses would be thicker than those of the present invention. Both the sandwich and the overcoated lenses would be more likely to delaminate than those of the present invention.

U.S. Pat. Nos. 3,786,034 (Blair et al.), 3,821,136 (Hudgin et al.), and 4,359,558 (Gould et al.) disclose contact lenses made of polyurethane. However, these patents do not disclose the use of isocyanate compounds as a color binding material.

This invention is predicated on the surprising discovery that a reaction mechanism previously used to coat and color leather (i.e. totally non-analogus art), as disclosed in U.S. Pat. Nos. 2,884,340 (Loshaek) and 2,884,336 (Loshaek et al.) can be used to bind color substances to the surface of contact lenses, producing colored contact lenses that are very durable, can be hydrophilic or non-hydrophilic, can obtain transparent or opaque coloring substances, and have substantially the same thickness as ordinary, non-colored, contact lenses.

SUMMARY OF THE INVENTION

The present invention comprises a method of making a colored contact lens comprising the steps of:

(a) providing a contact lens constructed of polymer, (b) coating at least a portion of a surface of the lens with a color coat comprising coloring substance and binding polymer, and (c) binding the lens polymer to the binding polymer by the reaction of functional groups selected from at least one of —COOH, —OH, and —NH—R, wherein R is hydrogen or alkyl with functional groups selected from at least one of —NCO and epoxy, wherein either (A) the lens polymer and binding polymer have functional groups selected from at least one of —COOH, —OH, and —NH—R, and the color coat also comprises an additional compound having at least two groups per molecule selected from at least one of —NCO and epoxy; or (B) the lens polymer has functional groups selected from at least one of —COOH, —OH, and —NH—R, and the binding polymer has functional groups selected from at least one of —NCO and epoxy; or (C) the lens polymer has functional groups selected from at least one of —NCO and epoxy, and the binding polymer has functional groups selected from at least one of —COOH, —OH, and —NH—R; or (D) the lens polymer and binding polymer have functional groups selected from at least one of —NCO and epoxy and the color coat also comprises an additional compound having at least two groups per molecule selected from at least one of —COOH, —OH, and —NH—R.

Some coloring substances have functional groups which may also react with the above described functional groups, and this reaction is also within the scope of the invention. However, as explained later, the choice of coloring substances is not limited to those having reactive functional groups.

A second aspect of the invention comprises colored contact lenses made by the inventive method.

DETAILED DESCRIPTION OF THE INVENTION

The lenses colored by the inventive process are constructed of a polymer having functional groups selected from Group A or B:

Group A: at least one of —COOH, —OH, and —NH—R, wherein R is hydrogen or alkyl, preferably lower alkyl.

Group B: —NCO and epoxy.

The term polymer means a material formed by polymerizing one or more monomers or a blend of such polymers. The functional groups project from the polymer backbone or from another group that projects from the polymer backbone. For example, polymerized hydroxyethyl methacrylate may be represented by:

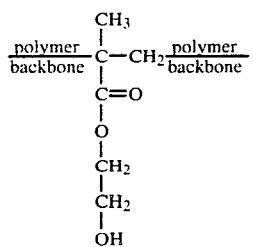

The hydroxyl functional group is at the bottom of the above representation.

As used herein the term "alkyl" means a straight-chain, branched-chain and cyclic saturated hydrocarbon groups having 1 to 8 carbon atoms; $C_1$ to $C_2$ alkyl groups are preferred.

Examples of suitable monomers that may be used for providing the functinal groups of Group A include acrylic acid; methacrylic acid; hydroxy $C_1$ to $C_6$ alkyl esters of acrylic and methacrylic acid, such as hydroxyethyl methacrylate, hydroxypropyl methacrylate, hydroxybutyl methacrylate and hydroxyethyl acrylate; amino $C_1$ to $C_6$ alkylesters of acrylic and methyacrylic acid, such as aminoethyl methacrylate, aminooctyl methacrylate, N-methyl aminoethyl methacrylate, N-Octylaminoethyl methacrylate, and aminopentyl acrylate; glyceryl esters of acrylic and methacrylic acid, such as glyceryl mono methacrylate, glyceryl mono acrylate, and combinations thereof. Examples of suitable monomers that may be used for providing the functional groups of Group B include isocyanato ethyl methacrylate, glycidyl methacrylate, and combinations thereof.

In addition to the above, the contact lenses may also contain copolymerized monomers not having the functional groups, for example, N-vinyl heterocyclic monomers, such as N-vinyl-2-pyrrolidone; $C_1$ to $C_6$ alkyl vinyl ethers, such as vinyl ethyl ether; $C_1$ to $C_6$ alkyl ester of acrylic or methacrylic acid, such as methyl methacrylate and propyl acrylate; $C_1$ to $C_6$ alkyl styrene, such as t-butyl styrene; vinyl monomers, such as vinyl chloride and vinyl acetate; diene monomers, such as isoprene; and $C_1$ to $C_6$ alkoxy $C_1$ to $C_6$ alkyl esters of acrylic or methacrylic acid, such as ethoxyethyl methacrylate or methoxypropyl acrylate.

A preferred monomer for making the lenses is hydroxyethyl methacrylate.

Examples of preferred lens polymers are described in U.S. Pat. No. 4,405,773 (Loshaek et al.) and contain 75 to 95 weight percent hydroxy straight-or-branched-chain $C_2$ to $C_4$ alkyl monoester of acrylic or methacrylic acid (preferably hydroxyethyl methacrylate), 5 to 20 percent $C_2$-$C_4$ alkoxy $C_2$-$C_4$ alkyl ester of acryilc or methacrylic acid (preferably ethoxyethyl methacrylate) and 0.3 to 4 percent acrylic or methacrylic acid (preferably methacrylic acid).

If the lens is to be hydrophilic, large amounts of hydrophilic monomers which provide —OH, or —COOH functional groups, such as hydroxyethyl methacrylate and methacrylic acid, are used. For hard lenses, large amounts of monomers not containing hydrophilic functional groups, such as methyl methacrylate or t-butyl styrene, are used in combination with small amounts, i.e. amounts sufficient to provide the required adhesion, of monomers having the functional groups.

Polymerization and lens shaping are well known in the art and are not part of this invention. Any of the well known techniques may be used, provided the lens polymer has the functional groups.

To produce lenses in accordance with the invention, at least a portion of the surface of the lens is coated with a color coat comprising coloring substance and binding polymer which, like the lens polymer also has functional groups selected from Group A or Group B. If the lens polymer contains functional groups from Group A and the binding polymer has functional groups from Group B, or vice versa, the lens and binding polymers may be bonded directly to each other. However, if both the lens and binding polymers have functional groups from the same Group, for example Group A, then a compound having at least two functional groups per molecule of the other Group is used, e.g. if both lens and binding polymer have functional groups per molecule from Group B is used. Furthermore, if both lens and binding polymer have functional groups from the same Group, the functional groups need not be the same or in the same amount in the lens and binding polymer. It is within the scope of this invention to use more than one color coat on the same lens, with each color coat comprising the same or different binding systems described herein.

Suitable compounds having at least two functional groups of Group B include hexamethylene diisocyanate (OCN—$(CH_2)_6$—NCO), and bisphenol A diepoxide,

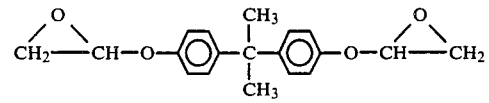

Suitable compounds having at least two functional groups of Group A include ethylene glycol, ethylene diamine, and adipic acid.

Either the front or rear surface or both may be coated, but the front convex surface is easier to coat than the rear concave surface. The coated lens is then subjected to conditions which cause the functional groups of Group A to react with the functional groups of Group B. If the coloring substance is transparent and the lens is a hard lens having a diameter no larger than that of the iris, then the entire lens surface may be coated. If the coloring substance is opaque, than only the portion of the lens corresponding to the iris should be coated, leaving the pupil section clear. For hydrophilic lenses, which are larger than the iris, the portion of the lens extending beyond the iris may be left uncoated.

The presently preferred embodiment of the invention is to use lens and binding polymer having functional groups from Group A, and to use a compound having at least two isocyanate groups per molecule to supply the functional groups from Group B. The remainder of this description is directed to that embodiment. However, other embodiments may be carried out using similar principles.

There are three preferred ways to carry out the coating step of the inventive method:

(1) A mixture comprising coloring substance, binding polymer, isocyanate compound, and a solvent is coated onto the lens surface or portion thereof.

(2) The lens is first coated with a mixture of isocyanate compound and a solvent and this coating is, in turn, coated with a mixture of binding polymer, coloring substance, and solvent.

(3) The separate coating steps of method (2) are reversed. The lens is first coated with a mixture of binding polymer, coloring substance, and solvent and this coating is coated with a mixture of the isocyanate compound and solvent.

The description of monomers used in preparing the binding polymer is the same as that for monomers used in making the lens. The functional groups (at least one of —OH, —COOH, and —NH—R) are present. For hydrophilic lenses the binding polymer may be made from the same monomers present in the same concentration as was used to make the lens. However, this is not absolutely necessary, as long as both polymers are such that upon hydration warpage does not occur. The binding polymer is preferably prepared in a solution that initially contains the selected monomers, solvent for the monomers, a molecular weight modifier and a polymerization initiator in a reaction vessel that is heated for a period sufficient to achieve a satisfactory polymerization level. This produces an uncrosslinked polymer dissolved in solvent which preferably contains some residual unreacted monomer. It is desirable to limit the molecular weight and amount of crosslinking of the polymers to maintain the viscosity of the reaction solution in a usable range.

The molecular weight of the binding polymer may be conveniently controlled by using a molecular weight modifier such as a chain transfer agent, as is well known in the art. Suitable chain transfer agents include 2-mercapto ethanol, 1-dodecyl mercaptan and other alkyl mercaptans. Use of extra solvent is also a way to control molecular weight.

Suitable polymerization initiators include free radical initiators such as 2,2-azobis(isobutyronitrile), benzoyl peroxide, t-butyl peroxybenzoate, and t-butyl peroxide. However, the exact method of polymerizing the binding polymer is not critical.

Suitable solvents include ethyl cellosolve, cyclopentanone, ethanol, t-butanol, acetone and other aliphatic and alicyclic ketones. A combination of solvents may be used. Ethyl lactate is a good co-solvent and under some circumstances water may be used as a co-solvent. The preferred solvent is a combination of cyclopentanone and ethyl lactate. The binding polymer solution and coloring substance are milled to form a colorant paste.

If the binding polymer, coloring substance and isocyanate compound are to be applied in one step, the colorant paste, isocyanate compound and optional additional monomers are blended to form an ink, paint, or other applyable material which is coated onto the lens. If the applyable material is to be stored for long periods of time, it should be prepared without the isocyanate compound, which can be blended with the applyable material just prior to its being coated on to the lens. The pot life of the applyable material depends upon the reactivity of the isocyanate compound with the functional groups of the binding polymer.

The choice of coloring substances is quite flexible, since they need not necessarily contain functional groups. Preferred coloring substances include for a blue color, phthalocyanine blue (Pigment Blue 15, C.I. 74160); for a green color, phthalocyanine green (Pigment Green 7, C.I. 74260) and chromium sesquioxide; for yellow, red, brown and black colors, various iron oxides. Of course, blends of such coloring substances are used to achieve the desired shade. For an opaque coating, titanium dioxide is a preferred opaquing agent. Opaquing agents, which are considered to be coloring substances within the present specification and claims, are blended with the other coloring substances into the colorant paste.

Hexamethylene diisocyanate ($OCN-(CH_2)_6-NCO$) is the preferred isocyanate compound. However, use of any isocyanate having the formula $R^1(NCO)_n$ wherein n is greater than or equal to two, (preferably two) is within the scope of this invention. $R^1$ may be a di- or greater valent organic radical such as aliphatic, alicyclic, aliphatic-alicyclic, aromatic, or aliphatic-aromatic hydrocarbon. Thus, other suitable isocyanate compounds are 2,4-toluene diisocyanate and bis(isocyanato phenyl)methane.

It has been found that the addition of a crosslinking agent for the lens and binding polymer, such as ethylene glycol dimethacrylate reduces the amount of isocyanate compound needed to achieve good adhesion.

The coated lens is then subjected to conditions which cause the isocyanate groups to react with the functional groups of the binding and lens polymers, thereby firmly binding the lens and binding polymer to each other and entrapping the coloring substance within the binding polymer in a manner which forms a very stable, durable colored contact lens. Of course, some coloring substances may have functional groups that also react directly with the isocyanate groups, and such additional reaction is also within the scope of this invention. Typically the lens is dried under vacuum at at least about 20° C. (preferably 50° C.) for at least about 15 (preferably 30 minutes) to evaporate the solvent, then cured at at least about 70° C. (preferably 90° C.) for at least about 30 miinutes (preferably 90 minutes). Catalyst to speed the reaction of the isocyanate compound with the lens and binder polymers may be added to the ink immediately prior to its being coated onto the lens. Such catalysts include tertiary amines, such as triethylamine, benzyl dimethylamine, dimethylcyclohexyl amine; and metallic catalysts such as stannous octoate and dibutyltin dilaurate. The above conditions are illustrative and not intended to limit the scope of the invention. Time and temperature can be optimized for any combination of materials.

For colored hydrophilic contact lenses, the cured lenses are hydrated by methods commonly used for uncolored hydrophilic lenses.

The following table shows the desirable amounts of ingredients used to form inks in accordance with the invention.

| INGREDIENT | WEIGHT PERCENT OF COMPONENTS IN INK | | |
| --- | --- | --- | --- |
| | BROAD RANGE | PREFERRED RANGE | MORE PREFERRED RANGE |
| Binding Polymer (including residual unreacted monomer) | 10–40 | 13–25 | 16–23 |
| Isocyanate | Functional (1) | 0.5–10 | 1.5–5 |

| INGREDIENT | WEIGHT PERCENT OF COMPONENTS IN INK | | MORE PREFERRED RANGE |
|---|---|---|---|
| | BROAD RANGE | PREFERRED RANGE | |
| Compound | Amount | | |
| Opaque Coloring Substance (if opaque color is desired) | Functional (1) Amount | Functional (1) Amount | 6.5–30 |
| Transparent Coloring Substance (if transparent color is desired) | Functional (1) Amount | Functional (1) Amount | 1–20 |
| Polymerization Initiator | 0–1.0 | 0.05–0.5 | 0.1–0.3 |
| Additional Monomers | Functional (1) Amount | 0–50 | 15–30 |
| Solvent | q.s. ad 100% | q.s. ad 100% | q.s. ad 100% |

(1) "Functional Amount" means the amount which an experimenter, skilled in the art, would use to achieve the desired result.

The following examples illustrate invention. In the examples the following abbreviations are used.
HEMA is 2-hydroxyethyl methacrylate
EOEMA is 2-ethoxyethyl methacrylate
MAA is methacrylic acid
AIBN is azobis(isobutyronitrile)
HMD is hexamethylene diisocyanate
ME is 2-mercapto ethanol

EXAMPLES

Example 1

Preparation of a Binding Polymer-Solvent Mixture

Prepare a mixture containing 91.5 parts HEMA, 8 parts EOEMA, 0.5 parts MAA, 0.5 parts ME and 0.5 parts AIBN. Dissolve 43 parts of this mixture in 57 parts of ethylcellosolve (57 parts cyclopentanone is currently preferred). Polymerize by heat (typically 38° C. for 48 hours for this mixture) until only about 10 percent of the monomer remains. This amount of polymerization for this formulation has been found to provide the proper application viscosity and adhesion characteristics. The amount of residual monomer remaining at any time can be determined by gas chromatrography. The viscosity of the mixture after polymerization was about 25,000 cps. To 100 parts of the resulting mixture, add 38 parts of ethyl lactate and dissolve. The resulting Binding Polymer-Solvent mixture is used as a starting material in further examples.

Example 2

Preparation of a Colorant Paste

The binding polymer-solvent mixture prepared in example 1 is blended with coloring substance in the ratios shown in the table below to form a slurry. The slurry is milled on a roll mill for about 15 minutes until a homogeneous paste results. Alternatively, the paste may be prepared by ball milling the coloring substance with the binding polymer and solvents.

| Example | Coloring Substance | Parts Coloring Substance | Parts Binding-polymer Solvent Mixture | Resulting Color |
|---|---|---|---|---|
| 2A | Phthalocyanine blue | 1 | 66 | Transparent blue |
| 2B | Chromium sesquioxide | 4 | 9 | Green |
| | and phthalocyanine blue (300:1) | | | |
| 2C | Same as for example 2B | 1 | 3 | Green |
| 2D | Iron oxides and chromium sesquioxide (3:2) | 4 | 13 | Brown |
| 2E | Phthalocyanine blue and TiO$_2$ (1:21) | 1 | 12.5 | Opaque blue |

Example 3

Preparation of Ink

Because the color coat is to be applied to the lens by printing, the materials prepared by these examples are inks. However, other application methods, such as painting or spraying are possible. Hence, use of inks, paints, and other color coating substances are in accordance with the invention.

Transparent and opaque inks suitable for coating on to contact lenses are prepared by blending the ingredients listed in the following table.

| Example No. | Ingredients |
|---|---|
| 3A | 3 parts paste of example 2E |
| | 1 part monomer mixture containing |
| | HEMA 91.5 parts |
| | EOEMA 8 parts |
| | MAA 0.5 parts |
| | AIBN 0.5 parts |

Example 3A uses no isocyanate compound and is for comparison purposes only.

| Example No. | Ingredients |
|---|---|
| 3B | 3 parts paste of example 2E |
| | 1 part monomer mixture containing |
| | HEMA 91.5 parts |
| | EOEMA 8 parts |
| | MAA 0.5 parts |
| | AIBN 0.5 parts |
| | HMD 0.61 percent of the above 4 parts |
| 3C | 3 parts paste of example 2E |
| | 1 part monomer mixture containing |
| | HEMA 91.5 parts |

| Example No. | Ingredients |
|---|---|
| 3D | EOEMA 8 parts<br>MAA 0.5 parts<br>AIBN 0.5 parts<br>HMD 0.99 percent of the above 4 parts<br>3 parts paste of example 2E<br>1 part monomer mixture containing |
| 3E | HEMA 91.5 parts<br>EOEMA 8 parts<br>MAA 0.5 parts<br>AIBN 0.5 parts<br>HMD 1.5 percent of the above 4 parts<br>3 parts paste of example 2E<br>1 part monomer mixture containing |
| 3F | HEMA 91.5 parts<br>EOEMA 8 parts<br>MAA 0.5 parts<br>AIBN 0.5 parts<br>HMD 1.98 percent of the above 4 parts<br>3 parts paste of example 2E<br>1 part monomer mixture containing |
| 3G | HEMA 91.5 parts<br>EOEMA 8 parts<br>MAA 0.5 parts<br>AIBN 0.5 parts<br>HMD 2.44 percent of the above 4 parts<br>3 parts paste of example 2E<br>1 part monomer mixture containing |
| 3H | HEMA 91.5 parts<br>EOEMA 8 parts<br>MAA 0.5 parts<br>AIBN 0.5 parts<br>HMD 4.79 percent of the above 4 parts<br>3 parts paste of example 2E<br>1 part monomer mixture containing |
| 3I | HEMA 91.5 parts<br>EOEMA 8 parts<br>MAA 0.5 parts<br>AIBN 0.5 parts<br>HMD 9.7 percent of the above 4 parts<br>3 parts paste of example 2A<br>1 part monomer mixture of example 3F<br>HMD, 2.44 percent of the above 4 parts |
| 3J | 3 parts paste of example 2B<br>1 part monomer mixture of example 3F<br>HMD, 2.44 percent of the above 4 parts |
| 3K | 3 parts paste of example 2D<br>1 part monomer mixture of example 3F<br>HMD, 2.44 percent of the above 4 parts |

Example 4

Alternative Ink Compositions

Prepare a mixture containing 88.1 parts HEMA, 9.8 parts EOEMA, 2.1 parts MAA, 0.5 PARTS AIBN, and 0.5 parts ME. Dissolve 43 parts of this mixture in 57 parts of cyclopentanone. Polymerize by heat until about 10 percent of the monomers remain. To 100 parts of the resulting mixture add 38 parts of ethyl lactate and dissolve to form a binding polymer-solvent mixture.

Repeat examples 2A through 2E using this binding polymer-solvent mixture to form colorant pastes similar to colorant pastes 2A through 2E.

Repeat example 3 making inks having the following formulas:

| Example No. | Ingredients |
|---|---|
| 4A | 3 parts paste similar to 2E<br>1 part monomer mixture containing<br>HEMA 88.1 parts<br>EOEMA 9.8 parts<br>MAA 2.1 parts<br>AIBN 0.1 parts<br>HMD 2.44 percent of the above 4 parts |
| 4B | 3 parts paste similar to 2A<br>1 part monomer mixture of example 4A<br>HMD, 2.44 percent of the above 4 parts |
| 4C | 3 parts paste similar to 2B<br>1 part monomer mixture of example 4A<br>HMD, 2.44 percent of the above 4 parts |
| 4D | 3 parts paste similar to 2D<br>1 part monomer mixture of example 4A<br>HMD, 2.44 percent of the above 4 parts |

Example 5

Repeat example 4A, except omit the AIBN, and use 2.75 percent HMD.

Example 6

Repeat example 3D, except replace the HMD with an equal amount of 2,4-toluene diisocyanate.

Example 7

Printing and Testing of Colored Lenses

Unhydrated hydrophilic contact lenses manufactured as described in U.S. Pat. No. 4,405,773, are printed in an annular pattern as described in U.S. patent application Ser. No. 600,860, filed Apr. 16, 1984, now U.S. Pat. No. 4,582,402 with the inks of examples 3 to 6. The printed lenses are dried under vacuum at 50° C. for 30 minutes, then cured at 90° C. for 90 minutes.

The printed contact lenses are hydrated by submersion in a stirred normal saline solution (0.9 percent by weight of salt in water) at pH 8 and temperature of 90°–100° C. for 2 hours. The hydrated lenses are stored in normal saline buffered at a pH of 7.4.

Two test methods (the rub test and the methanol test) may be used to determine the strength of the adhesive bond. The hydrated lenses are folded back upon themselves in the rub test, printed side in, and rubbed between the thumb and forefinger. In the methanol test the hydrated lenses are sprayed with methanol at room temperature for 30 seconds. In both tests adhesion or lack thereof is observed visually. The methanol test is more severe than the rub test. Batches of 5 lenses are tested. Results of the tests are reported in the table below.

| Ink Examle No. | Lens Material[a] | Test Results (Pass/Fail) | |
|---|---|---|---|
| | | RUB | Methanol |
| 3A | 1 | 0/5 | 0/5 |
| 3B | 1 | 1/4 | not tested |
| 3C | 1 | 4/1 | not tested |
| 3D | 1 | 5/0 | not tested |
| 3E | 1 | 5/0 | not tested |
| 3F | 1 | 5/0 | 5/0 |
| 3G | 1 | 5/0 | not tested |
| 3H | 1 | 5/0 | not tested |
| 3I | 1 | 5/0 | 5/0 |
| 3J | 1 | 5/0 | 5/0 |
| 3K | 1 | 5/0 | 5/0 |
| 4A | 2 | 5/0 | 5/0 |
| 4B | 2 | 5/0 | 5/0 |
| 4C | 2 | 5/0 | 5/0 |
| 4D | 2 | 5/0 | 5/0 |
| 5 | 2 | 5/0 | not tested |

| Ink Example No. | Lens Material[a] | Test Results (Pass/Fail) RUB | Methanol |
|---|---|---|---|
| 6 | 1 | 5/0 | not tested |

[a]Lenses made of material 1 contain
91.5 parts HEMA
8 parts EOEMA
0.5 parts MAA
and had a water content after hydration of 38%.
Lenses made of material 2 contain
88.1 parts HEMA
9.8 parts EOEMA
2.1 parts MAA
and had a water content of 55% after hydration.

In the test results Sample 3A, which contains no diisocyanate in the color coat, shows adhesion failure. Adhesion improves as more diisocyanate is added.

Example 8

A contact lens comprising 88.1 percent HEMA, 9.8 percent EOEMA, and 2.1 percent MAA is coated with a solution of 1 percent HMD in 2,2-diethoxy propane. The lens is air dried and printed with an ink having the same composition as the ink of example 3A but containing no diisocyanate. Upon hydration, all five lenses pass the rub test.

This example illustrates an alternative technique for attaching the colorant to the lens, i.e., by precoating the lens with the isocyanate compound prior to application of the ink.

Example 9

A lens containing 91.5 percent HEMA, 8 percent EOEMA, and 0.5 percent MAA is printed with the ink of example 3F. The printed pattern is overcoated with a clear material containing binding polymer, solvent and HMD, but no coloring substance.

The binder-polymer solvent mixture contains substantially uncrosslinked polymers and monomers (approx. 70–80 percent polymerized) of 91.5 percent HEMA, 8 percent EOEMA and 0.5 percent MAA as a 25 percent solids solution in cyclopentanone.

The clear coating material consists of 66.50 parts of the binding polymer solvent mixture, 33.25 parts cyclopentanone and 0.25 parts HMD. Approximately 5 microliters of this solution is spread onto the printed, dried surface of the lens.

After curing the coating, all five lenses pass the rub test. This example shows yet another method of causing the ink to adhere to the lens.

Example 10

An ink was prepared with Gantrez S-95(1) as the polymeric binder. Gantrez S-95(1) is a hydrolyzed methyl vinyl ether-maleic anhydride copolymer from GAF Corporation.
(1) Trademark or Tradename 8.0 grams of Gantrez S-95 is stirred into 29.0 grams of ethyl cellosolve and 11.3 grams of distilled water. 34.4 grams of this mixture is blended with 13.2 grams of a slurry of 1.79 weight percent phthalocyanine blue and 37.08 percent $TiO_2$ in ethyl lactate.

2.45 grams of HMD is added to the blended mixture with stirring. Lenses of the composition 88.1 percent HEMA, 9.8 percent EOEMA and 2.1 percent MAA are printed with this colorant. The printed lenses are heated at 80° C. for 72 hours at atmospheric pressure. Another set of lenses are printed and heated the same way except that the colorant has no HMD. The lenses with no HMD in the colorant do not pass the rub test. The lenses with HMD in the colorant pass both the rub test and the methanol test. This example illustrates the case in which the binding polymer and lens polymers are different.

It can be seen that the present invention provides a degree of versatility and durability not achievable with prior coloring technique. The color coat may be opaque or transparent. Hard or Soft lenses may be colored. The color coating applied to hydrophilic lenses is more durable than coating applied by prior art methods. Selected portions of the lens may be coated. Indeed the coating may be deposited over the iris section of the lens in a highly desirable pattern.

I claim:

1. A method for making a colored contact lens comprising the steps of:
   (a) providing a contact lens constructed of polymer having functional groups selected from at least one of —COOH, —OH, and —NH—R, wherein R is hydrogen or $C_1$ to $C_8$ alkyl,
   (b) coating at least a portion of a surface of the lens with a color coat comprising coloring substance, binding polymer having functional groups selected from at least one of —COOH, —OH, and —NH—R, wherein R is hydrogen or $C_1$ to $C_8$ alkyl, and an additional compound having at least two groups per molecule selected from at least one of —NCO and epoxy, and
   (c) binding the lens polymer to the binding polymer by the reaction of the functional groups selected from at least one of —COOH, —OH, and —NH—R, wherein R is hydrogen or $C_1$ to $C_8$ alkyl with the functional groups selected from at least one of —NCO and epoxy.

2. The method of claim 1 wherein the additional compound contains two isocyanate groups.

3. The method of claim 2 wherein the additional compound is selected from hexamethylene diisocyanate, 2,4-toluene diisocyanate, and bis(isocyanatophenyl) methane.

4. The method of claim 3 wherein the lens polymer and binding polymer are formed from monomers comprising at least one monomer selected from acrylic acid, methacrylic acid, hydroxy $C_1$ to $C_6$ alkyl ester of acrylic and methacrylic acid, amino-$C_1$ to $C_8$ alkyl ester of acrylic and methacrylic acid, glycerol esters of acrylic and methacrylic acid, and mixtures thereof.

5. The method of claim 4 wherein the lens polymer and binding polymer further comprise at least one monomer selected from N-vinyl-2-pyrrolidone, $C_1$ to $C_8$ alkyl vinyl ethers, $C_1$ to $C_8$ alkyl esters of acrylic or methacrylic acid, $C_1$ to $C_8$ alkyl styrene, vinyl chloride, vinyl acetate, isoprene, and alkoxy-$C_1$ to $C_8$ alkyl ester of acrylic or methacrylic acid.

6. The method of claim 5 wherein the lens polymer and binding polymer are formed from a mixture of monomers comprising hydroxyethyl methacrylate, ethoxyethyl methacrylate and methacrylic acid and the additional compound is hexamethylene diisocyanate.

7. The method of claim 6 further comprising the step of applying a transparent, substantially pigment-free, coat comprising binding polymer over the color coat.

8. A lens made by the method of claim 1.
9. A lens made by the method of claim 2.
10. A lens made by the method of claim 3.
11. A lens made by the method of claim 4.
12. A lens made by the method of claim 5.

13. A lens made by the method of claim 6.

14. A lens made by the method of claim 7.

15. A method for making a colored contact lens comprising the steps of:
   (a) providing a contact lens constructed of polymer having functional groups selected from at least one of —COOH, —OH, and —NH—R, wherein R is hydrogen or $C_1$ to $C_8$ alkyl,
   (b) coating at least a portion of a surface of the lens with a color coat comprising at least one pigment and binding polymer having functional groups selected from at least one of —NCO and epoxy, and
   (c) binding the lens polymer to the binding polymer by the reaction of the functional groups selected from at least one of —COOH, —OH, and —NH—R, wherein R is hydrogen or $C_1$ to $C_8$ alkyl with the functional groups selected from at least one of —NCO and epoxy.

16. A lens made by the method of claim 15.

17. A method for making a colored contact lens comprising the steps of:
   (a) providing a contact lens constructed of polymer having functional groups selected from at least one of —NCO and epoxy,
   (b) coating at least a portion of a surface of the lens with a color coat comprising at least one pigment and binding polymer having functional groups selected from at least one of —COOH, —OH, and —NH—R, wherein R is hydrogen or $C_1$ to $C_8$ alkyl, and
   (c) binding the lens polymer to the binding polymer by the reaction of the functional groups selected from at least one of —COOH, —OH, and —NH—R, wherein R is hydrogen or $C_1$ to $C_8$ alkyl with the functional groups selected from at least one of —NCO and epoxy.

18. A lens made by the method of claim 17.

19. A method for making a colored contact lens comprising the steps of:
   (a) providing a contact lens constructed of polymer having functional groups selected from at least one of —NCO and epoxy,
   (b) coating at least a portion of a surface of the lens with a color coat comprising at least one pigment binding polymer having functional groups selected from at least one of —NCO and epoxy, and an additional compound having at least two groups per molecule selected from at least one of —COOH, —OH, and —NH—R, wherein R is hydrogen or $C_1$ to $C_8$ alkyl, and
   (c) binding the lens polymer to the binding polymer by the reaction of the functional groups selected from at least one of —COOH, —OH, and —NH—R, wherein R is hydrogen or $C_1$ to $C_8$ alkyl with the functional groups selected from at least one of —NCO and epoxy.

20. A contact lens made by the method of claim 19.

21. A colored contact lens comprising:
   (a) a lens body constructed of polymer
   (b) at least one pigment mixed with binding polymer on at least a portion of a surface of the lens,
   wherein the binding polymer and lens polymer are bonded to each other by the reaction of functional groups selected from at least one of —COOH, —OH, and —NH—R, wherein R is hydrogen or $C_1$ to $C_8$ alkyl with functional groups selected from at least one of —NCO and epoxy, wherein the lens polymer and binding polymer are formed from at least one monomer selected from acrylic acid, methacrylic acid, hydroxy $C_1$ to $C_6$ alkyl ester of acrylic or methacrylic acid, amino $C_1$ to $C_8$ alkyl ester of acrylic or methacrylic acid, glycerol esters of acrylic or methacrylic acid and mixtures thereof.

* * * * *

UNITED STATES PATENT AND TRADEMARK OFFICE
CERTIFICATE OF CORRECTION

PATENT NO. : 4,668,240
DATED : May 26, 1987
INVENTOR(S) : Loshaek

It is certified that error appears in the above—identified patent and that said Letters Patent is hereby corrected as shown below:

In column 4, line 16, after

"and binding polymer have functional groups" insert

-- of Group A, a compound having at least two functional groups --.

In claim 1, step (b) column 12, line 22, change "coloring substance" to

-- at least one pigment --.

Signed and Sealed this

Twenty-ninth Day of September, 1987

*Attest:*

DONALD J. QUIGG

*Attesting Officer*   *Commissioner of Patents and Trademarks*